US010189376B2

(12) United States Patent
Heeg et al.

(10) Patent No.: US 10,189,376 B2
(45) Date of Patent: Jan. 29, 2019

(54) ACTUATOR FOR A VEHICLE SEAT, AND VEHICLE SEAT

(71) Applicant: Johnson Controls Components GmbH & CO. KG, Kaiserslautern (DE)

(72) Inventors: Norbert Heeg, Dahn (DE); Peter Mueller, Mackenbach (DE)

(73) Assignee: Johnson Controls Components GmbH & CO. KG, Kaiserslautern (DE)

( * ) Notice: Subject to any disclaimer, the term of this patent is extended or adjusted under 35 U.S.C. 154(b) by 191 days.

(21) Appl. No.: 14/917,388

(22) PCT Filed: Sep. 8, 2014

(86) PCT No.: PCT/EP2014/069090
§ 371 (c)(1),
(2) Date: Mar. 8, 2016

(87) PCT Pub. No.: WO2015/032946
PCT Pub. Date: Mar. 12, 2015

(65) Prior Publication Data
US 2016/0214507 A1 Jul. 28, 2016

(30) Foreign Application Priority Data

Sep. 9, 2013 (DE) .......................... 10 2013 218 016
Nov. 27, 2013 (DE) .......................... 10 2013 224 248

(51) Int. Cl.
*B60R 1/12* (2006.01)
*B60N 2/005* (2006.01)
(Continued)

(52) U.S. Cl.
CPC ....... *B60N 2/0232* (2013.01); *B60N 2/01583* (2013.01); *B60N 2/0244* (2013.01);
(Continued)

(58) Field of Classification Search
CPC .................................. B60N 2/23; B60N 2/64
See application file for complete search history.

(56) References Cited

U.S. PATENT DOCUMENTS

2003/0057910 A1    3/2003  Nivet
2011/0169315 A1*   7/2011  Heeg .................. B60N 2/01583
                                                          297/378.12
(Continued)

FOREIGN PATENT DOCUMENTS

CN    101468587 A    7/2009
DE    94 08 916 U1   10/1994
(Continued)

OTHER PUBLICATIONS

Korean Office Action dated May 18, 2017 with translation.

*Primary Examiner* — Bickey Dhakal
*Assistant Examiner* — Charles S Laughlin
(74) *Attorney, Agent, or Firm* — McGlew and Tuttle, P.C.

(57) ABSTRACT

An actuator (110, 210) for a vehicle seat (1) includes a housing (11), a motor (12) which is fixed to the housing and includes a motor shaft (12a), a transmission (13) connected to the motor shaft, an actuator output drive (14) which is connected to the transmission, and a control unit (21). The actuator output drive includes an output element moveable towards an end position from a starting position by rotating the motor shaft in a first direction and in a reversed direction—in the direction of the starting position from the end position. A carriage (15) is driven, upon movement of the output element. A position sensor detects a position of the carriage. An actuator (210) for a vehicle seat is provided, in which a position sensor (28) detects an effect of gravity on the actuator. A vehicle seat (1) with one such actuator (110, 210) is provided.

20 Claims, 7 Drawing Sheets

(51) Int. Cl.
*B60N 2/02* (2006.01)
*B60N 2/90* (2018.01)
*B60N 2/015* (2006.01)
*B60N 2/22* (2006.01)
*B60N 2/36* (2006.01)

(52) U.S. Cl.
CPC ........... *B60N 2/2245* (2013.01); *B60N 2/366* (2013.01); *B60N 2/919* (2018.02); *B60N 2/929* (2018.02); *B60N 2002/0236* (2013.01); *B60N 2002/0272* (2013.01); *B60N 2002/957* (2018.02)

(56) References Cited

U.S. PATENT DOCUMENTS

| | | | | |
|---|---|---|---|---|
| 2012/0093580 | A1* | 4/2012 | Heeg | B60N 2/0232 403/376 |
| 2012/0145867 | A1* | 6/2012 | Benthien | B64C 1/20 248/429 |
| 2013/0275006 | A1* | 10/2013 | Ystueta | B60N 2/0244 701/49 |
| 2013/0305857 | A1* | 11/2013 | Heeg | B60N 2/0224 74/89.23 |

FOREIGN PATENT DOCUMENTS

| | | | |
|---|---|---|---|
| DE | 100 48 270 A1 | 4/2002 | |
| DE | 10 2004 056 707 A1 | 9/2005 | |
| DE | 697 33 141 T2 | 1/2006 | |
| DE | 10 2009 038072 A1 | 3/2011 | |
| EP | 2 062 758 A1 | 5/2009 | |
| JP | S61-261587 A | 11/1986 | |
| JP | 2000-062567 A | 2/2000 | |
| JP | 2012-502838 A | 2/2012 | |
| JP | 2012-523338 A | 10/2012 | |
| WO | 2008/058529 A2 | 5/2008 | |
| WO | 2010/115626 A1 | 10/2010 | |
| WO | 2012/104027 A1 | 8/2012 | |
| WO | 2012/104207 A1 | 8/2012 | |
| WO | WO 2012104027 A1 * | 8/2012 | ........... B60N 2/0224 |
| WO | 2012/152361 A1 | 11/2012 | |

* cited by examiner

ACTUATOR FOR A VEHICLE SEAT, AND VEHICLE SEAT

CROSS REFERENCE TO RELATED APPLICATIONS

This application is a United States National Phase Application of International Application PCT/EP2014/069090 filed Sep. 8, 2014 and claims the benefit of priority under 35 U.S.C. § 119 of German Patent Applications 10 2013 218 016.0 filed Sep. 9, 2013 and 10 2013 224 248.4 filed Nov. 27, 2013 the entire contents of which are incorporated herein by reference.

FIELD OF THE INVENTION

The invention relates to an actuator for a vehicle seat having a housing, a motor, which is fixed to the housing and which has a motor shaft, a transmission, which is connected at the output side to the motor by means of the motor shaft, an actuator output drive, which is connected at the output side to the transmission, and a control unit, wherein the actuator output drive has an output element, which can be moved in the direction of an end position from a starting position by rotating the motor shaft in a first direction of rotation, wherein the direction of rotation of the motor shaft can be reversed from the first direction of rotation to an opposite second direction of rotation by means of the control unit, thus allowing the output element to be moved from the end position in the direction of the starting position. The invention also relates to a vehicle seat having the features of the actuator according to the invention.

BACKGROUND OF THE INVENTION

An actuator of the type in question, by means of which a locking unit known from WO 2012/152361 A1 can be unlocked, for example, is known from WO 2012/104207 A1.

Locking units are encountered in many forms in vehicle seats. The essential task of known locking units is to be able to produce different seating configurations of the vehicle seat (e.g. the folding over of a rear seat backrest to increase the luggage space) or to enable convenient adjustment of the vehicle seat (driver seat and/or rear seats). Both tasks are performed by different categories of locking unit.

The first category of locking unit comprises fixed point locking systems. These are distinguished by the fact that the locking unit locks only in one position of the seat and/or of the backrest and hence fixes the seat and/or the backrest relative to an adjacent component, generally relative to the vehicle. These locking units, e.g. rotary latch locks, are sometimes referred to as locks or latches and are typically used with folding backrests to increase the luggage space. To a very large extent, the locking unit is positioned in the backrest. Other applications are systems for locking removable seats to the vehicle floor and also locking systems within a seat in the case of flexible seating systems.

The second category of locking unit differs from the first category in that the locking units can be locked in different positions. It is thus possible to adjust components of the seat relative to the seat itself and/or to the vehicle in accordance with the stipulations of a customer. This category is typically used to adjust the inclination of the backrest. In some cases, these locking units are also developed to enable a rear seat bench system to be folded over. These locking units, e.g. latching fitments, are sometimes also referred to as levers.

Actuation of the locking units is very largely accomplished by hand (manual actuation). Depending on the installation space situation and requirements, an actuating unit for the locking unit can be spatially separated from the locking unit. In this case, the force is generally transmitted from the actuating unit to the locking unit by a Bowden cable. Thus, the user of the seat gives the signal and simultaneously supplies the necessary force to unlock the locking unit. Sometimes, and especially when using Bowden cables, there can be a considerable rise in the actuating force.

To improve convenience, electric actuation is used as well as manual actuation. In these cases, only the trigger command is given by a user. The necessary force is then produced by an actuator, which consequently opens the locking unit.

The different requirements made on the actuators in this context—both by the vehicle and by the user of the seat—cannot be satisfied by the actuators known from the prior art. To provide additional functions, e.g. position detection, status interrogation, communication or separation between the signal and the power, additional sensors, indicator elements and/or external control units are employed.

However, these are associated with disadvantages since it is often impossible to install a control unit close to the actuators, as a result of which certain functionalities, e.g. control of the actuators by pulse width modulation (PWM for short) can be achieved only at considerable expense. Moreover, additional sensors must be employed to produce complex information for the user. Thus, an additional angle transmitter must be installed to cancel unlocking again once the backrest has been completely folded over and needs to be locked in this position.

An actuator which has a corresponding control unit is described in WO 2012/104027 A1. This actuator has the capacity for electric forward and reverse adjustment depending on the position of the actuating element in the actuator, which is sensed in the respective end positions. Automatic electric return is thereby possible, making it possible to eliminate the return spring.

SUMMARY OF THE INVENTION

It is an underlying object of the invention to make available an actuator which can reliably detect the locking state of a locking unit coupled to the actuator. Moreover, it should alternatively or additionally be possible to determine the position of the actuator in the gravitational field of the earth in order to draw conclusions from this about the position of the seat component to be locked by means of the locking unit, e.g. a backrest.

Thus, it is the object to make the actuator intelligent, giving it the capability to detect the state of locking of the locking unit, i.e. whether it is locked or not locked, to detect its own state and other states, such as a folded-over backrest, i.e. a position outside a position which allows sitting.

The intelligence of the actuator should be configured so as to avoid additional external sensors. Moreover, manual actuation of the locking unit should also be possible.

It is another object to reduce energy consumption and the moving mass to unlock a locking unit.

It is furthermore part of the object to provide a vehicle seat having a corresponding actuator.

According to the invention an actuator of the type in question for a vehicle seat comprises a housing, a motor, which is fixed to the housing and which has a motor shaft, a transmission, which is connected at the output side to the motor by means of the motor shaft, an actuator output drive, which is connected at the output side to the transmission, and a control unit, wherein the actuator output drive has an output element, which can be moved in the direction of an end position from a starting position by rotating the motor shaft in a first direction of rotation, wherein the direction of rotation of the motor shaft can be reversed from the first direction of rotation to an opposite second direction of rotation by means of the control unit, thus allowing the output element to be moved from the end position in the direction of the starting position.

According to the invention, a slide, which can be moved relative to the housing and which can be driven during a movement of the output element from the starting position in the direction of the end position, and a position sensor for detecting at least one position of the slide are provided.

It is thereby possible to integrate a signal detection system required to indicate that a locking unit is not locked into the actuator. If the slide of the actuator is coupled to a catch of the locking unit, the state of locking of the locking unit can be detected by means of the position sensor.

For this purpose, the slide has means—a catch coupling—in particular a pin, for coupling to the catch of the locking unit.

It is advantageous if the slide is decoupled from the output element during a movement of the output element from the end position in the direction of the starting position.

The actuator according to the invention is a development of the actuator with automatic electric return known from WO 2012/104207 A1. This already has an appropriate control unit with a microcontroller, sensors for controlling the motor and a corresponding output stage. By means of the position sensor, the state of locking of the locking unit is detected. Thus, the state of locking of the locking unit is interrogated and indicated to the user of the vehicle seat, even in the case of manual actuation of the locking unit.

By virtue of the fact that the actuator has a position sensor which detects the action of gravity on the actuator, the position of the actuator in the gravitational field can be detected. Corresponding sensors are known from smart phones.

An integrated position sensor, in particular an acceleration sensor, detects the orientation of the actuator with respect to the earth's gravitational field and can thus detect whether a backrest is upright or folded over. The respective, distinctly different states of the backrest in these two positions make it possible to use just one acceleration sensor for reliable sensing. Possible slopes on which the vehicle is parked are within the threshold values.

It is advantageous if the actuator output drive has a spindle, along which the output element and the slide can be moved linearly. During this process, the output element undergoes linear displacement along the longitudinal axis of the spindle when the latter performs a rotation about the longitudinal axis. The slide is not coupled to the spindle and can thus be moved along the longitudinal axis of the spindle independently of a rotation of the spindle.

During this process, the spindle preferably passes through a through hole in the slide. It is also conceivable for the slide to have a slot or some other guide.

The solution of the problem also consists in relocating the necessary control unit and necessary information sources into the actuator and combining both functional units (actuator and control unit) in one housing, enabling the actuator to be combined with a locking unit as a self-contained intelligent functional unit.

A control board, on which all the component elements are combined to ensure intelligent operation, is integrated in the actuator according to the invention. The circuit board has a microcontroller, which is equipped with software for bundling the information and outputting corresponding commands. Various sensors, e.g. Hall effect sensors, position sensors, gravitational force sensors and/or acceleration sensors, are furthermore present on the circuit board, on the one hand enabling the position and hence status of the actuator and/or the state of locking of the locking unit to be determined. In particular, it is advantageous if the position sensor is integrated into the circuit board.

If the actuator also has a current sensor, which measures the current flowing through the motor, the rotation of the motor can be regulated and said motor can be operated with an appropriate power and in an energy-efficient manner.

According to an advantageous development of the invention, a first sensor for sensing the end position of the output element and/or a second sensor for sensing the starting position of the output element are also integrated in the circuit board.

By means of a communications interface (e.g. LIN/CAN or other systems), it is possible to output the status of the actuator and the position of the backrest to other parties in the vehicle and/or to combine the information within the actuator and thus control other actuators in accordance therewith.

In addition to the functions which are necessary for unlocking the locking unit, further functions can also be implemented by means of the control unit of the actuator. For example, it is possible to integrate appropriate protection algorithms, ensuring that continuous actuation of the actuator does not lead to a fault in the actuator. In addition or as an alternative, the actuator can be deactivated while the vehicle is being driven, thus excluding accidental actuation during driving.

Owing to the short distances between the control system for the actuator and the motor of the actuator, it is possible to employ a PWM function at low cost, said function making it possible to modify the noise of the motor, especially during the force-free return of the actuator, within certain limits.

Further examples of the use of an actuator according to the invention are a head restraint retractor and/or head restraint fold-down system. After detection that the locking unit is unlocked and/or after detection that the backrest is falling beyond the vertical position thereof into a folded-down position, the actuator can be activated by the control unit within the actuator to additionally fold down the head restraint.

As an option, further modules, such as a heating or ventilation system for example, can also be controlled in accordance with the position of the backrest and/or with the state of locking of the locking unit.

The locking indicator within a dashboard of a vehicle can be activated or deactivated in accordance with the position of the backrest.

The object is also achieved by an actuator having a position sensor that detects the action of gravity on the actuator. It is thereby possible for the actuator to detect whether a backrest is upright or folded, for example.

The object is also achieved by a vehicle seat, which comprises at least one actuator according to the invention.

The invention is explained in greater detail below by means of two figures relating to the prior art and two advantageous illustrative embodiments, which are shown in the further figures. However, the invention is not restricted to these illustrative embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

A vehicle seat 1 of a motor vehicle has at least one actuator 110, 210, by means of which a seat component can be adjusted or a function, including opening of a locking unit 60, can be triggered. In the present case, the actuator 110, 210 according to the invention is operatively connected to a locking unit 60 known from the prior art, e.g. from WO 2012/152361 A1, in such a way that activation of the actuator 110, 210 leads to unlocking of the locking unit 60.

Figure 1:
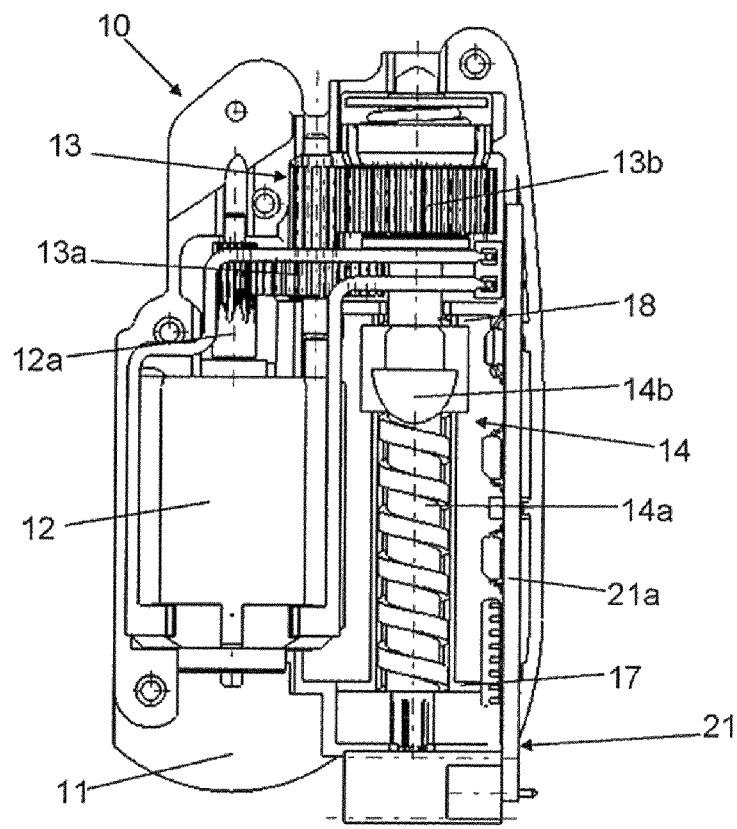
FIG. 1 is a plan view of an actuator known from the prior art.
Figure 2:
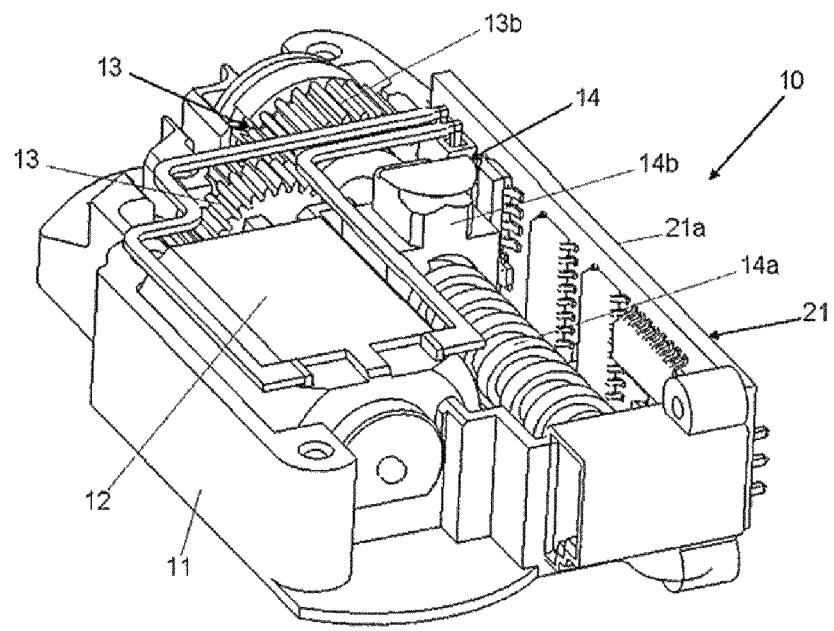
FIG. 2 is a perspective view of the actuator from FIG. 1.
Figures 3, 4:
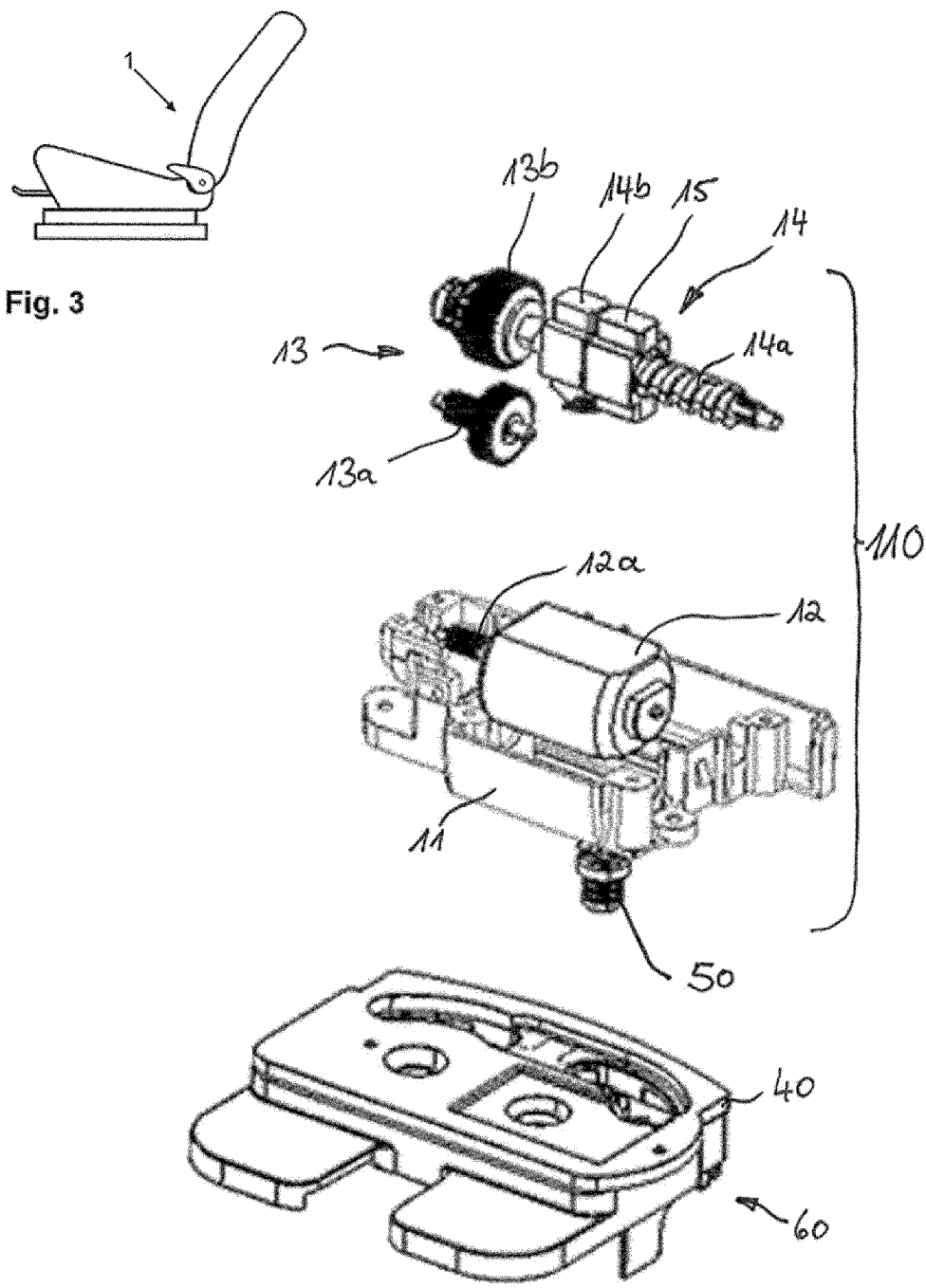
FIG. 3 is a schematic representation of a vehicle seat.
FIG. 4 is an exploded representation of a first illustrative embodiment of an actuator according to the invention and of a locking unit known from the prior art.

FIGS. 1 and 2 show an actuator 10 known from WO 2012/104027 A1, the basic construction of which underlies the actuator 110, 210 according to the invention and which is therefore described first below.

The actuator 10 has a housing 11, within which an electric motor 12 is arranged in a manner fixed to the housing. A transmission 13 is connected to the motor 12 on the output side in that the motor shaft 12a of the motor 12, said motor shaft being provided with toothing, meshes with a larger-diameter input spur wheel segment of a first gearwheel 13a of the transmission 13, which is mounted rotatably in the housing 11. A smaller-diameter output spur wheel segment of the first gearwheel 13a meshes with a larger-diameter second gearwheel 13b of the transmission 13, which is likewise mounted in the housing 11.

Connected to the transmission 13 on the output side is an actuator output drive 14, which in the present case is designed as a spindle mechanism. For this purpose, the second gearwheel 13b, which is designed as a spur wheel, is secured on a spindle 14a of the actuator output drive 14. The center line of the spindle 14a is in alignment with the axis of rotation of gearwheel 13b and is mounted rotatably in the housing 11. In the present case, the spindle 14a is arranged parallel to the motor shaft 12a. Some other arrangement of the spindle 14a, e.g. at right angles to the motor shaft 12a, is also conceivable. Interacting with a thread of the spindle 14a is a spindle nut with an internal thread seated on the spindle 14a, said nut serving as the output element 14b of the actuator output drive 14. The output element 14b is mounted in the housing 11 so as to be movable along the spindle 14a, but it cannot rotate around the spindle 14a. A rotary motion of the spindle 14a thus causes a linear motion of the output element 14b.

In the initial state, i.e. in the unactuated state of the actuator, the output element 14b is arranged at the end of the spindle 14a adjacent to the second gearwheel 13b. In the unactuated state of the actuator, the output element 14b is moved by the rotating spindle 14a in the direction of the end of the spindle 14a remote from the second gearwheel 13b. It is also conceivable for the output element 14b to be arranged at the end of the spindle 14a remote from the second gearwheel 13b in the unactuated state of the actuator. In this case, the output element 14b is moved in the direction of the end of the spindle 14a adjacent to the second gearwheel 13b by the rotating spindle in the actuated state of the actuator.

To sense the end position of the output element 14b, a first sensor 17 is arranged in a manner fixed to the housing on that bearing of the spindle 14a which is situated at the end of the spindle 14a remote from the second gearwheel 13b. To sense the starting position of the output element 14b, a second sensor 18 is arranged in a manner fixed to the housing on that bearing of the spindle 14a which is situated at the end of the spindle 14a with the second gearwheel 13b. The sensors 17 and 18 can be of mechanical design, being designed as micro switches for example, or of inductive design, being designed as Hall effect sensors, for example, or of capacitive design.

Arranged on one side of the housing 11, in the present case on the side of the actuator output drive 14 spatially remote from the motor 12, is a control unit 21, in the present case a circuit board 21a having a plurality of IC modules, e.g. logic modules, power-controlling modules, in particular for pulse width modulation, output stages, e.g. a full bridge, communications modules and components for protecting the control unit 21 from overvoltage, ESD/EMC, temperature or the like. As an alternative, all these functions are integrated into an individual module, which has corresponding interfaces. For example, the circuit board 21a forms a wall of the housing 11.

The control unit 21 preferably has an internal power supply with two voltage terminals, which project outward from the circuit board 21a. The control unit 21 furthermore preferably has a network interface with at least one signal connection. The network interface is used, for example, for communication with a LIN bus, which uses one signal connection and the supply connection. As an alternative, the network interface can be used for communicating with some other data bus, e.g. a CAN bus, which then requires more connections, or some other network.

The control unit 21 preferably also has a sensor interface, which is connected to the first sensor 17 and the second sensor 18. The control unit 21 preferably has a logic unit, to which the network interface and the sensor interface are connected.

Finally, the control unit 21 preferably has a motor controller, which is connected to the logic unit and controls the motor 12, more specifically both as regards the direction of rotation and as regards current limitation. The motor controller and logic unit, the network interface and the sensor interfaces are supplied by the internal power supply. Power transistors or the like can be provided outside the IC module for the motor controller.

As a subassembly, the actuator 10 contains mechanical, electrical, in particular electric-motor, and electronic components, thus allowing all necessary functions to be integrated into the actuator 10 and processed within the actuator 10. In the present case, communication to the vehicle seat 1 and to the vehicle, in particular to actuating elements, takes place via the network interface with appropriate implementation. The other functions are determined essentially by the hardware of the control unit 21. From a mechanical point of view, the motor 12, the transmission 13 and the spindle 14a, in each case together with the bearings, as well as the control unit 21 are preferably fully integrated into the housing 11.

In addition or as an alternative, position detection can be accomplished not only by means of the sensors 17 and 18, the data of which are fed in by means of the sensor interface, but also by means of current, voltage and time measurement. The characteristic of the change in these parameters can be used to make a distinction at the output element 14b between the attainment of the end position or the starting position, on the one hand, and jamming in a central position. Apart from digital position detection by means of the sensors 17 and 18, continuous position detection by means of a corresponding sensor would also be possible.

The motor controller preferably has current limitation by means of pulse width modulation. After a limit value for the current has been exceeded, this being measured by means of a shunt on the circuit board 21a for example, the voltage for the motor 12 is reduced by means of pulse width modulation to ensure that the motor 12 does not receive more than the predefined limit value for the current. The motor controller furthermore has reversal of the direction of rotation, which is used both to return the actuator 10 and as overload protection. In the first direction of rotation of the motor shaft 12a, the motor 12 moves the output element 14b from the starting position in the direction of the end position by means of the transmission 13 and the spindle 14a.

With the second direction of rotation of the motor shaft 12a, which is opposed to the first direction of rotation of the motor shaft 12a, the motor 12 moves the output element 14b from the end position back in the direction of the starting position. Owing to this return by means of a reversal in the direction of rotation, clutches and springs are eliminated. Owing to the elimination of the spring to be loaded, the motor 12 does not have to be so powerful, and therefore the power of the motor 12 is fully available for controlling the actuator. Implementation of return by means of a reversal in the direction of rotation is accomplished, for example, by means of a full bridge with power transistors, which controls the motor 12.

Starting from an unactuated, passive state, the actuator 10 is activated, as a result of which it changes to an actuated, active state, by means of a switching process which is triggered by the user at an actuating element and is preferably transmitted by means of the data bus to the actuator 10. As an alternative, activation of the actuator 10 is triggered by means of a simple electric pushbutton switch. Between the activation of the actuator 10 and the switching off of the motor current, whereby the actuator assumes a passive state, the user has no influence on the actuator 10, i.e. the network interface is locked.

The return of the actuator 10, i.e. the return of the output element 14b to the starting position, can be performed in an active way on the basis of a switching process initiated by the operator or on the basis of a particular position of the actuator 10. When used in a discontinuous locking unit 60 by means of a switching process, e.g. at a pushbutton switch from "0" to "1", for example, the actuator 10 can be activated for unlocking, with the result that the locking unit 60 opens. When the locking unit 60 is open, the control unit 21 switches over by virtue of the position detection and operates the motor 12 with a reversal in the direction of rotation until the output element 14b reaches the starting position again and the motor 12 is switched off again by virtue of the position detection. The actuator 10 is then in the passive state. The locking unit 60 can then lock mechanically, unhindered by the actuator 10. Alternatively, the control unit 21 switches the motor 12 off when the locking unit 60 is open and operates it with a reversal in the direction of rotation only after a switching process from "1" to "0".

The reversal in the direction of rotation upon overload preferably takes place when a mechanical overload must be assumed from the position detection, in particular in a central position, i.e. when neither a starting position nor an end position of the output element 14b is present but the power requirement is nevertheless rising sharply. The motor 12 undergoes a reversal in the direction of rotation, and the output element 14b is preferably brought back into its starting position to ensure that the actuator 10 does not remain in the jammed position.

In FIGS. 4 to 13, the actuator 110 is described as a first illustrative embodiment of an actuator according to the invention. The basic construction of the actuator 110 corresponds substantially to the basic construction of the actuator 10 known from the prior art, which has been described above. Components which act in the same way therefore bear the same reference signs. Only those components and functions of actuator 110 which differ from actuator 10 are described.

A slide 15 is arranged in a linearly movable manner in the housing 11, next to the output element 14b, on the side of the output element 14b remote from the second gearwheel 13b. The spindle 14a passes through a through hole in the slide 15 without the thread of the spindle 14a being in thread engagement with the slide 15. The slide 15 is mounted in the housing 11 so as to be movable linearly relative to the spindle 14a and it cannot be rotated relative to the spindle 14a. A rotary motion of the spindle 14a thus does not cause any direct linear motion of the slide 15.

A peg-type pin 15a is secured, in the present case formed, on the slide 15. The pin 15a is used to couple the actuator 110 to the locking unit 60.

The locking unit 60 is designed as a rotary catch lock with a pawl for locking a mating element. The mating element, which is accommodated in a hook mouth of the pawl, cannot leave the pawl in the locked state of the locking unit 60. In an unlocked state of the locking unit 60, the pawl mouth is arranged in such a way that the mating element can leave the pawl and the locking unit 60.

As a part for connection to the actuator 110, the locking unit 60 has a catch 50 with a catch slot 52. By movement of the catch 50 in a defined actuating direction, the locking unit 60 is moved from the locked state to the unlocked state. Here, the position of the catch 50 relative to a housing of the locking unit 60 is dependent on the state of locking of the locking unit 60.

The slide 15 comprises a first magnet 16.1, and the output element 14b comprises a second magnet 16.2. The second magnet 16.2 interacts with the sensors 17, 18 and is used for detecting the position of the output element 14b and, in a manner known per se and described above, for controlling the motor 12. The first magnet 16.1 interacts with a position sensor, which is not shown in the figures, which is situated between the first sensor 17 and the second sensor 18 and is preferably integrated in the circuit board 21a. In a starting position of the slide 15, which corresponds to a locked state of the locking unit 60, the first magnet 16.1 is as close as possible to the position sensor.

In the locked state of the locking unit 60, the catch 50 is in a starting position. By movement of the catch 50 into an end position, the locking unit 60 is unlocked, and the mating element leaves the hook mouth of the pawl. As long as the mating element does not subsequently reenter the hook mouth of the pawl, the catch 50 remains in its end position associated with the unlocked state of the locking unit 60. When a mating element enters the hook mouth of the pawl and pivots the pawl into a lockable state and locks the pawl, the catch 50 is necessarily guided into its starting position.

The actuator 110 is screwed to the locking unit 60 by means of a plurality of screws 30 with an adapter 40 in between. The adapter 40 is a largely flat component with through holes for the screws 30. Other connection techniques, in particular snap-in connection, are also conceivable.

The pin 15a of the slide 15 reaches through an aperture in the form of an elongate hole in the adapter 40 into the catch slot 52. The catch slot 52 is of elongate design, wherein the width of the catch slot 52 is only slightly greater than the diameter of the pin 15a. The catch slot 52 is oriented transversely to the possible direction of motion of the slide 15, with the result that a movement of the slide 15 moves the catch 50 via the pin 15a.

Figure 5:
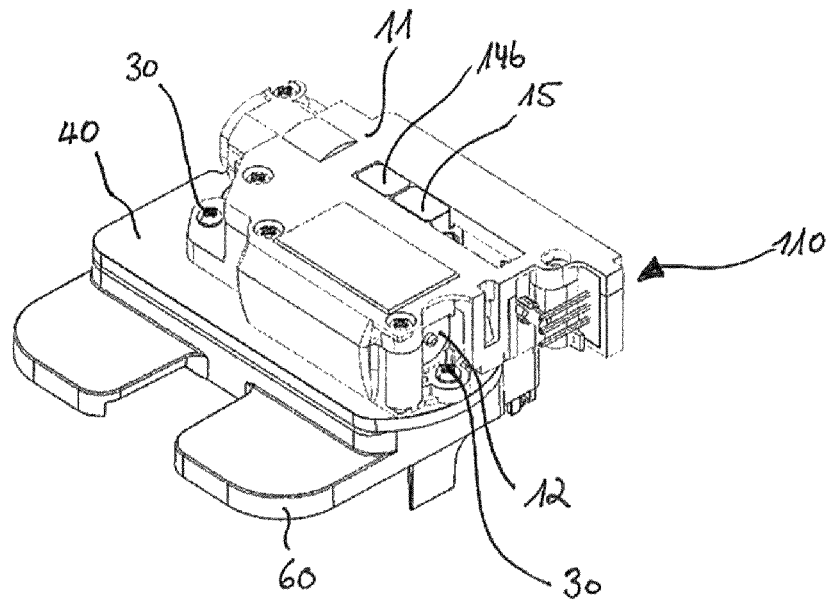
FIG. 5 is a perspective representation of the actuator and of the locking unit from FIG. 4 with the actuator housing closed, in the unactuated state of the actuator, an output element in a starting position and with the locking unit locked.
Figure 6:
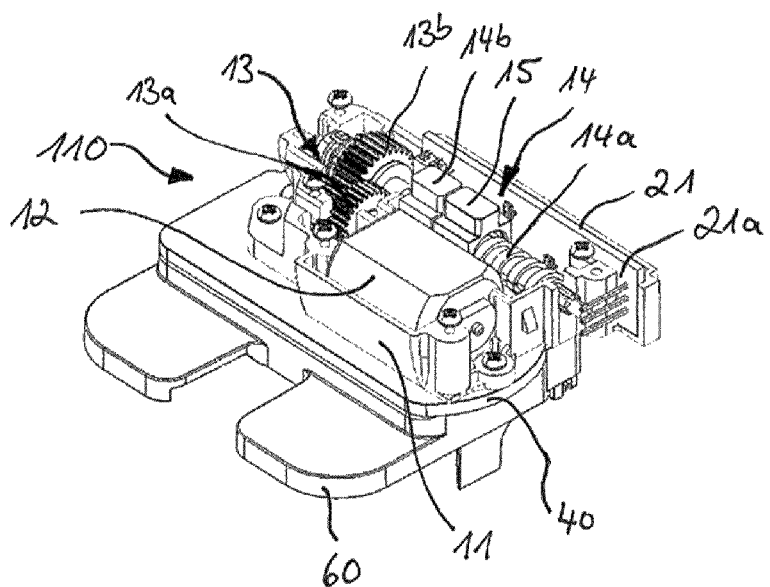
FIG. 6 is an illustration corresponding to FIG. 5 with the actuator housing open.

In FIGS. 5 and 6, the actuator 110 is in an unactuated state. The output element 14b and the slide 15 are each in the end position thereof. The locking unit 60 is unlocked.

Figure 7:
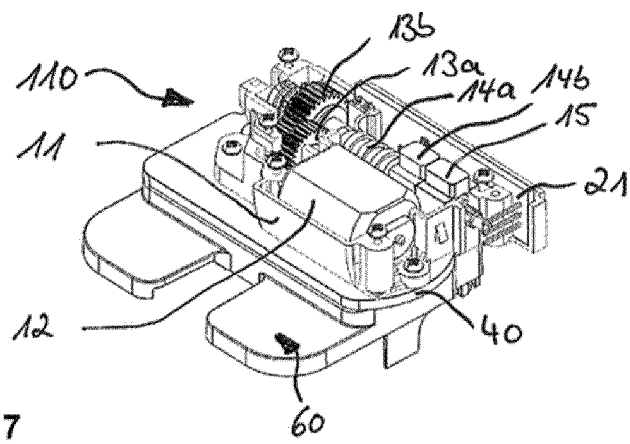
FIG. 7 is an illustration corresponding to FIG. 6 in the actuated state of the actuator when the end position of the output element is reached and with the locking unit unlocked.

In FIG. 7, the actuator is in an actuated state. The output element 14b and the slide 15 are each in the end position thereof. The locking unit 60 is unlocked. To adopt the illustrated end positions of the output element 14b and the slide 15, the output element 14b is driven via the spindle 14a and moved out of the starting position in the direction of the end position. During this process, the output element 14b takes along the catch 50, which unlocks the locking unit 60. During this process, the catch 15 moves the slide 50 by means of the catch slot 52 and the pin 15a.

In this end position, the position sensor detects that the first magnet 16.1 secured on the slide 15 is not in the vicinity of the position sensor and, as a result, produces a signal for "unlocked locking unit 60".

Figure 8:
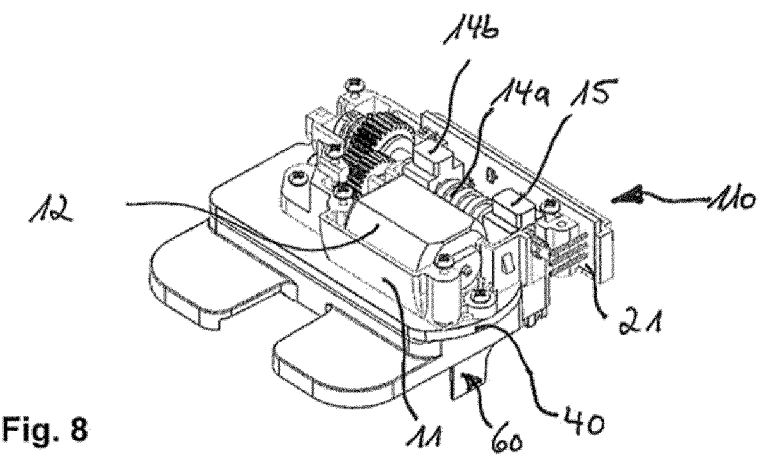
FIG. 8 is an illustration corresponding to FIG. 6 in the actuated state of the actuator when the starting position of the output element is reached again, and with the locking unit unlocked.
Figure 9:
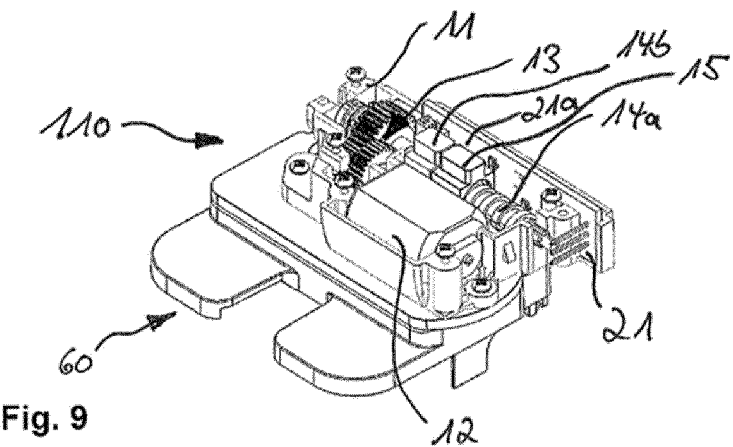
FIG. 9 is an illustration, corresponding to FIG. 6, in the unactuated state of the actuator after the starting position of the output element has been reached again, and with the locking unit locked.
Figure 10:
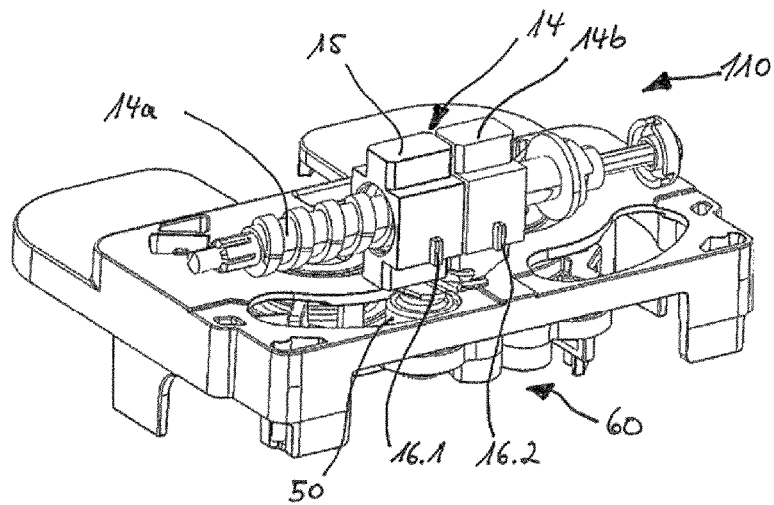
FIG. 10 is a perspective illustration of the locking unit and of the actuator output drive in the unactuated state of the actuator, the output element in a starting position and the locking unit locked.
Figure 11:
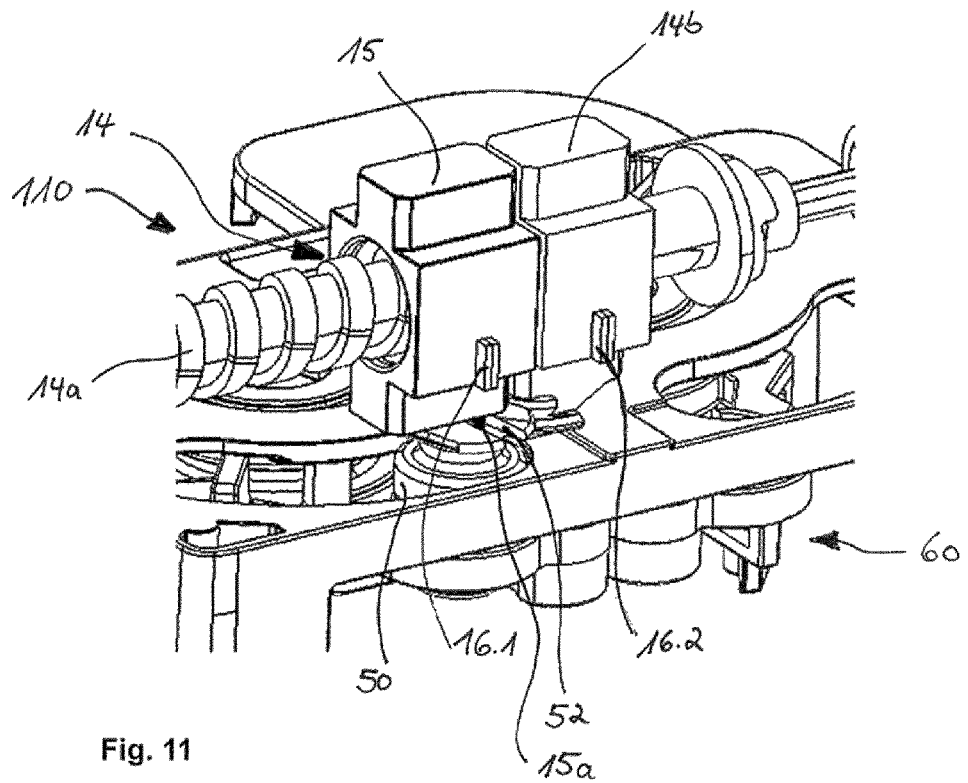
FIG. 11 is a detail of FIG. 10.
Figure 12:
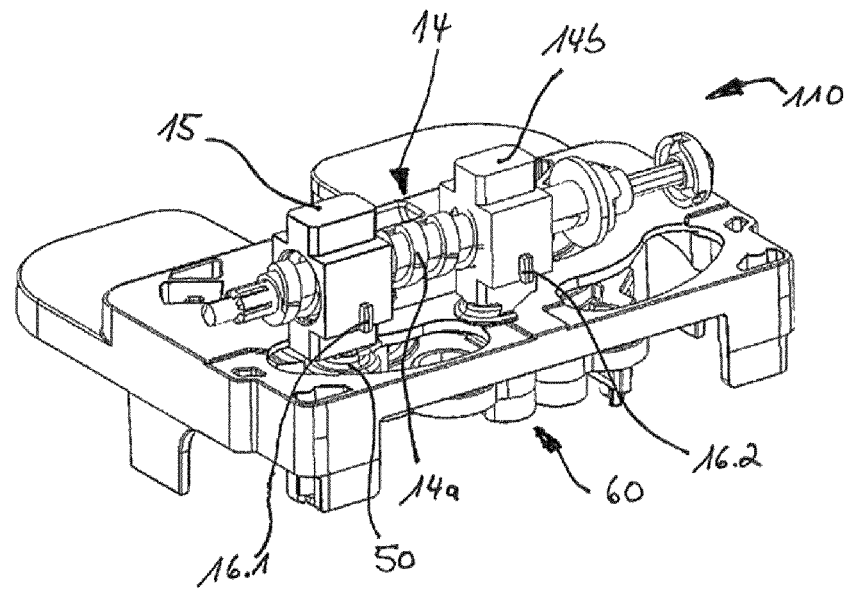
FIG. 12 is a perspective representation of the locking unit and of the actuator output drive in the unactuated state of the actuator, the output element in a starting position and the locking unit unlocked.
Figure 13:
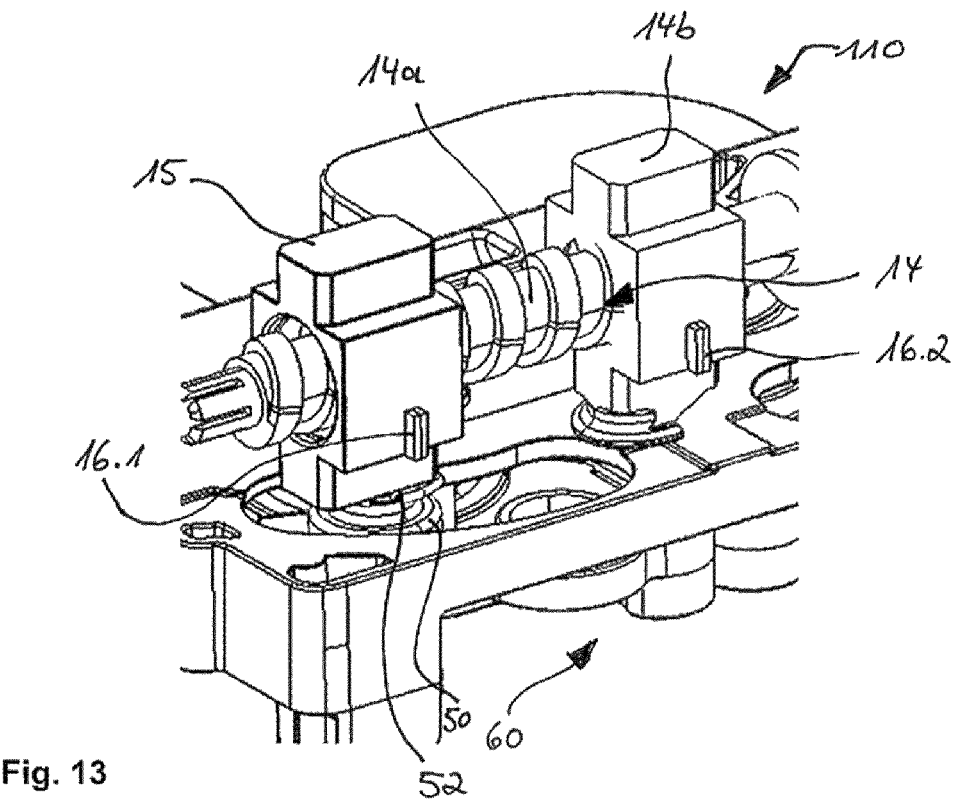
FIG. 13 is a detail of FIG. 12.

After the end position has been attained and hence after the unlocking of the locking unit 60, the output element 14b of the actuator 110 moves back automatically into the starting position thereof. The slide 15 remains in the end position since the locking unit 60 is in the unlocked position. This state is illustrated in FIG. 8. The position sensor continues to detect the state of locking of the locking unit 60 as unlocked.

If the locking unit 60 is locked, the slide 15 is moved along the spindle 14a in the direction of its starting position by the catch 50 of the locking unit 60 via the pin 15a until the slide 15 has once again reached its starting position. The first magnet 16.1 taken along on the slide 15 is detected by the position sensor. The position sensor of the actuator 110 detects the state of locking of the locking unit 60 as locked.

Figure 14:
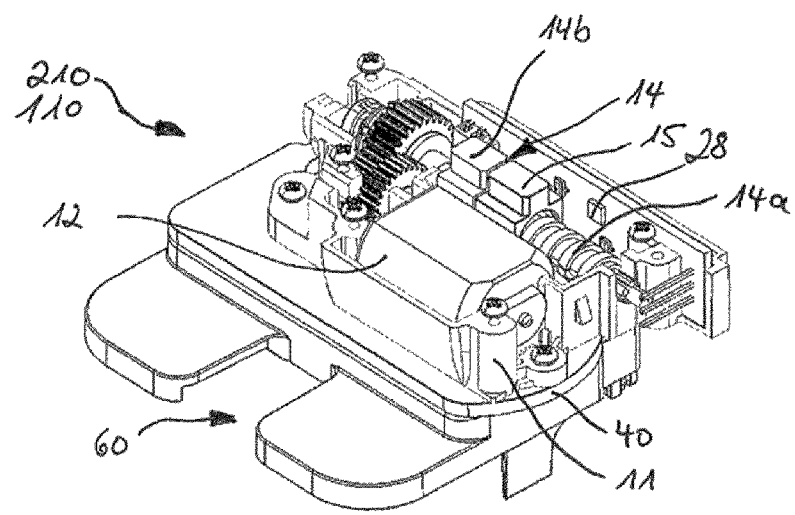
FIG. 14 is a perspective view of a second illustrative embodiment of an actuator according to the invention and of a locking unit known from the prior art.
Figure 15:
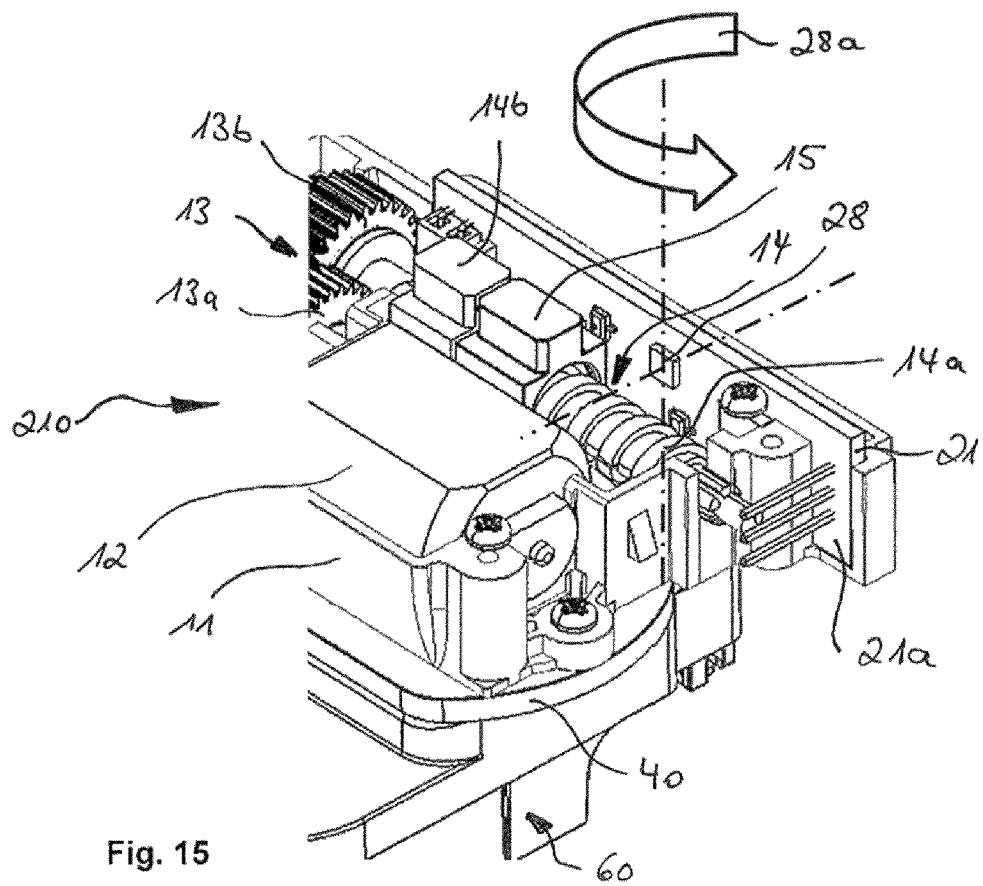
FIG. 15 is a detail of FIG. 14.

In FIGS. 14 and 15, actuator 210 is described as a second illustrative embodiment of actuator according to the invention. The basic construction of the actuator 210 corresponds largely to the basic construction of the actuator 110 described above. Components which act in the same way therefore bear the same reference signs. Only the components and functions of actuator 210 which differ from actuator 110 are described.

In comparison with the actuator 110 of the first illustrative embodiment, the actuator 210 of the second illustrative embodiment additionally has a gravitational force sensor as a position sensor 28, which detects position changes 28a of actuator 210. The position sensor 28 is secured on the circuit board 21a and is thus fixed relative to actuator 210. Actuator 210 is fixed on the locking unit 60 by means of the adapter 40. In the present case, the locking unit 60 is secured on a backrest of the vehicle seat 1. The position sensor 28 thus detects the position of the backrest via the action of gravity. The relevant axis is evaluated and actuator 210 detects whether the backrest has been folded into a position of nonuse or is in an upright position of use allowing occupation.

Actuator 210 thus detects, for example, whether the backrest is in an upright position of use and the locking unit 60 is simultaneously locked, making the vehicle seat 1 suitable for carrying an occupant. Actuator 210 likewise detects, for example, whether the backrest is in a flat position of nonuse and the locking unit 60 is simultaneously unlocked, i.e. that a desired unlocked position is present.

In a third illustrative embodiment, which is not shown in the figures, the slide 15 is omitted but a position sensor 28 is provided.

The features disclosed in the above description, the claims and the drawings can be significant either individually or in combination for the implementation of the invention in its various embodiments.

While specific embodiments of the invention have been shown and described in detail to illustrate the application of the principles of the invention, it will be understood that the invention may be embodied otherwise without departing from such principles.

The invention claimed is:

1. An actuator for a vehicle seat, the actuator comprising:
   a housing;
   a motor which is fixed to the housing and which has a motor shaft;
   a transmission, which is connected at an output side to the motor by means of the motor shaft;
   an actuator output drive, which is connected at an output side to the transmission;
   a control unit, wherein the actuator output drive has an output element, which is moved in a direction of an end position from a starting position by rotating the motor shaft in a first direction of rotation, wherein the direction of rotation of the motor shaft can be reversed from the first direction of rotation to an opposite second direction of rotation by means of the control unit, whereby the output element is moved from the end position in the direction of the starting position, and the actuator has a slide, which can be moved relative to the housing and which can be driven during a movement of the output element from the starting position in the direction of the end position; and
a position sensor for detecting at least one position of the slide, the actuator output drive having a spindle, along which the output element and the slide are movable, the spindle being in thread engagement with the output element, and the spindle passing through a through hole in the slide so as not to cause direct linear motion of the slide.

2. The actuator as claimed in claim 1, further comprising a locking unit with a catch wherein the slide includes a catch coupling for coupling to the catch of the locking unit.

3. The actuator as claimed in claim 2, wherein the catch coupling is a pin.

4. The actuator as claimed in claim 1, wherein the slide is decoupled from the output element during a movement of the output element from the end position in the direction of the starting position.

5. The actuator as claimed in claim 1, further comprising a position sensor, which detects the action of gravity on the actuator.

6. The actuator as claimed in claim 1, wherein the control unit has a circuit board, in which the position sensor is integrated.

7. The actuator as claimed in claim 6, further comprising at least one further sensor is arranged on the circuit board of the control unit.

8. The actuator as claimed in claim 7, wherein the at least one further sensor is a Hall effect sensor, a position sensor, a gravitational force sensor or an acceleration sensor or any combination of a Hall effect sensor, a position sensor, a gravitational force sensor and an acceleration sensor.

9. The actuator as claimed in claim 6, wherein a first sensor for sensing the end position of the output element or a second sensor for sensing the starting position of the output element or both a first sensor for sensing the end position of the output element and a second sensor for sensing the starting position of the output element are integrated in the circuit board.

10. An actuator as claimed in claim 1, wherein the output element comprises an output element through hole, at least a portion of the spindle being arranged in the output element through hole, the output element comprising outlet element threads, the spindle comprising spindle threads, at least one of the outlet element threads engaging at least one of the spindle threads, the spindle threads being free of thread engagement with the slide.

11. An actuator for a vehicle seat, the actuator comprising:
a housing;
a motor, which is fixed to the housing and which has a motor shaft;
a transmission, which is connected at an output side to the motor by means of the motor shaft;
an actuator output drive, which is connected at an output side to the transmission;
a control unit, wherein the actuator output drive has an output element, which is in the direction of an end position from a starting position by rotating the motor shaft in a first direction of rotation, wherein the direction of rotation of the motor shaft can be reversed from the first direction of rotation to an opposite second direction of rotation by means of the control unit, whereby the output element is moved from the end position in the direction of the starting position; and
a position sensor, which detects the action of gravity on the actuator or a position sensor for detecting at least one position of the slide, the actuator output drive having a spindle, along which the output element and the slide are movable, the spindle being in thread engagement with the output element, and the spindle passing through a through hole in the slide so as not to cause direct linear motion of the slide.

12. The actuator as claimed in claim 11, wherein the position sensor is an acceleration sensor.

13. An actuator as claimed in claim 11, wherein the output element comprises an output element through hole, at least a portion of the spindle being arranged in the output element through hole, the output element comprising outlet element threads, the spindle comprising spindle threads, at least one of the outlet element threads engaging at least one of the spindle threads, the spindle threads being free of thread engagement with the slide.

14. A vehicle seat comprising at least one actuator, the actuator comprising:
a housing;
a motor, which is fixed to the housing and which has a motor shaft;
a transmission, which is connected at an output side to the motor by means of the motor shaft;
an actuator output drive, which is connected at an output side to the transmission;
a control unit, wherein the actuator output drive has an output element, which is moved in the direction of an end position from a starting position by rotating the motor shaft in a first direction of rotation, wherein the direction of rotation of the motor shaft can be reversed from the first direction of rotation to an opposite second direction of rotation by means of the control unit, whereby the output element is moved from the end position in the direction of the starting position; and
a position sensor, which detects the action of gravity on the actuator or a position sensor which detects at least one position of the slide, the actuator output drive having a spindle, along which the output element and the slide are movable, the spindle being in thread engagement with the output element, and the spindle passing through a through hole in the slide so as not to cause direct linear motion of the slide.

15. A vehicle seat as claimed in claim 14, wherein the position sensor detects the action of gravity and comprises an acceleration sensor.

16. A vehicle seat as claimed in claim 14, further comprising a locking unit with a catch wherein the slide includes a catch coupling for coupling to the catch of a locking unit.

17. A vehicle seat as claimed in claim 14, wherein the slide is decoupled from the output element during a movement of the output element from the end position in the direction of the starting position.

18. A vehicle seat as claimed in claim 14, wherein the output element comprises an output element through hole, at least a portion of the spindle being arranged in the output element through hole, the output element comprising outlet element threads, the spindle comprising spindle threads, at least one of the outlet element threads engaging at least one of the spindle threads, the spindle threads being free of thread engagement with the slide.

19. A vehicle seat as claimed in claim 14, wherein the control unit has a circuit board, in which the position sensor is integrated.

20. The vehicle seat as claimed in claim 19, further comprising at least one further sensor arranged on the circuit board of the control unit, wherein the at least one further sensor is a Hall effect sensor, a position sensor, a gravitational force sensor or an acceleration sensor or any combination of a Hall effect sensor, a position sensor, a gravitational force sensor and an acceleration sensor.

* * * * *